United States Patent
Wang et al.

(10) Patent No.: US 11,632,713 B2
(45) Date of Patent: Apr. 18, 2023

(54) NETWORK CAPABILITY EXPOSURE METHOD AND DEVICE THEREOF

(71) Applicant: Beijing University of Posts and Telecommunications, Beijing (CN)

(72) Inventors: Luhan Wang, Beijing (CN); Yu Liu, Beijing (CN); Yunan Yan, Beijing (CN); Keliang Du, Beijing (CN); Xiangming Wen, Beijing (CN); Zhaoming Lu, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 135 days.

(21) Appl. No.: 17/330,108

(22) Filed: May 25, 2021

(65) Prior Publication Data
US 2022/0353795 A1    Nov. 3, 2022

(30) Foreign Application Priority Data
Apr. 28, 2021   (CN) .......................... 202110470045.5

(51) Int. Cl.
*H04W 48/16* (2009.01)
*G06N 3/08* (2023.01)
(Continued)

(52) U.S. Cl.
CPC ............ *H04W 48/16* (2013.01); *G06N 3/045* (2023.01); *G06N 3/08* (2013.01); *H04L 41/145* (2013.01);
(Continued)

(58) Field of Classification Search
CPC ..... H04W 48/16; H04W 24/02; H04W 48/18; G06N 3/0454; G06N 3/08; H04L 41/145; H04L 41/16
See application file for complete search history.

(56) References Cited

U.S. PATENT DOCUMENTS

2019/0020549 A1*   1/2019   Kim ........................ G06F 9/547
2022/0086218 A1*   3/2022   Sabella ................. H04L 67/141

FOREIGN PATENT DOCUMENTS

CN       103813329 A        5/2014
CN       106211137 A       12/2016
(Continued)

OTHER PUBLICATIONS

First Office Action issued in counterpart Chinese Patent Application No. 202110470045.5, dated Dec. 20, 2021.

*Primary Examiner* — Kwang B Yao
*Assistant Examiner* — Matthew R Fernandez
(74) *Attorney, Agent, or Firm* — Westbridge IP LLC

(57) ABSTRACT

Disclosed is a network capability exposure method, which includes receiving a service request sent by a third-party device; determining a type of a network capability required according to the service request; determining a computing task matching the type of the network capability required; determining computing resources exposed by at least one physical device; obtaining a computing resource exposure result based on the computing task and the computing resources exposed by the at least one physical device; acquiring a network capability corresponding to the type of the network capability and the computing resource exposure result; and providing the network capability to the third-party device. Further, a network capability exposure device, a network capability exposure system and a non-transitory computer-readable storage medium are also disclosed.

11 Claims, 5 Drawing Sheets

(51) Int. Cl.
    *H04L 41/14*          (2022.01)
    *H04L 41/16*          (2022.01)
    *H04W 24/02*         (2009.01)
    *H04W 48/18*         (2009.01)
    *G06N 3/045*          (2023.01)

(52) U.S. Cl.
    CPC ............. *H04L 41/16* (2013.01); *H04W 24/02* (2013.01); *H04W 48/18* (2013.01)

(56) References Cited

FOREIGN PATENT DOCUMENTS

| | | |
|---|---|---|
| CN | 106657194 A | 5/2017 |
| CN | 112232518 A | 1/2021 |
| WO | WO-2021123139 A1 * 6/2021 | ............... G06F 9/54 |

\* cited by examiner

NETWORK CAPABILITY EXPOSURE METHOD AND DEVICE THEREOF

CROSS-REFERENCE TO RELATED APPLICATIONS

The present application claims priority of Chinese patent application CN202110470045.5, filed on Apr. 28, 2021, the entire contents of which are incorporated herein by reference.

TECHNICAL FIELD

The present disclosure relates to the technical field of communications, in particular to a network capability exposure method, a device, a system and a non-transitory computer-readable storage medium thereof.

BACKGROUND

With the diversification of operating modes of mobile operators, the mobile operators may expose network information as a capability to a third party, so as to stimulate new service modes. Network capability exposure generally means exposing the network capability to a third party to realize friendly docking between the network capability and service requirements based on an exposure type interface technology, thereby improving service experience and optimizing network resource allocation. The network capability exposure may date back to the 4G era, namely, a service capability exposure function (SCEF) entity is defined to expose a core network element capability to various service applications in 3GPP R13, and the capability exposure is further supplemented and strengthened in subsequent standard versions. The network capability exposure is vital for promoting extensive use of such technologies as edge computing, industrial Internet and intelligent network, and plays an important role in various fields. Meanwhile, various applications also have diverse requirements on network capability exposure depth and level.

However, various network management applications only depend on a data acquisition exposure interface, a parameter configuration exposure interface and other interfaces provided by the network. The network management applications need to maintain components such as data analysis, algorithm training, service provision, and operation environment, which causes tight coupling between the services and the capabilities. Pure event monitoring, parameter configuration and data statistics are also difficult to meet the capability exposure requirements in different scenes.

SUMMARY

In view of the above, the present disclosure provides a network capability exposure method, a device, a system and a non-transitory computer-readable storage medium thereof.

According to some examples of the present disclosure, the network capability exposure method may be applied to a network capability exposure device and may include: receiving a service request sent by a third-party device; determining a type of a network capability required according to the service request; determining a computing task matching the type of the network capability required; determining computing resources exposed by at least one physical device; obtaining a computing resource exposure result based on the computing task and the computing resources exposed by the at least one physical device; acquiring network capabilities corresponding to the type of the network capability and the computing resource exposure result; and providing the network capabilities to the third-party device.

According to some examples of the present disclosure, the network capability exposure device may include: a third-party application layer unit, a network capability exposure layer unit, a network element layer unit, a computing capability exposure layer unit, and a physical device layer unit; wherein, the third-party application layer unit is configured to receive a service request sent by a third-party device; the network capability exposure layer unit is configured to determine a type of a network capability required according to the service request, determine a computing task matching the type of the network capability required, acquire, from the network element layer unit, network capabilities corresponding to the type of the network capability and a computing resource exposure result obtained from the computing capability exposure layer unit, and provide the network capabilities to the third-party device; and the computing capability exposure layer unit is configured to determine computing resources exposed by at least one physical device, and obtaining the computing resource exposure result based on the computing task and the computing resources exposed by the at least one physical device.

According to some examples of the present disclosure, the network capability exposure system may include: at least one third-party device; at least one physical device and a network capability exposure device.

According to some examples of the present disclosure, a non-transitory computer-readable storage medium is disclosed, wherein the non-transitory computer-readable storage medium stores computer instructions, and the computer instructions being used to make the computer execute the network capability exposure method.

According to the network capability exposure method, the device, the system and the non-transitory computer-readable storage medium in examples of the present disclosure, various network capabilities can be exposed to third-party devices to realize the network capability exposure by firstly determining the type of the network capability required by the third-party device, secondly providing computing resources corresponding to the type of the network capability required, and finally providing corresponding network capabilities obtained to the third-party device.

BRIEF DESCRIPTION OF DRAWINGS

To describe the technical solutions in the present disclosure or the related arts clearly, drawings used in the description of the examples will be briefly described below. Obviously, the drawings in the description below are just examples of the present disclosure. Those of ordinary skill in the art can also obtain other drawings based on these drawings without the exercise of inventive faculty.

DETAILED DESCRIPTION OF THE EXAMPLES

Figure 1:
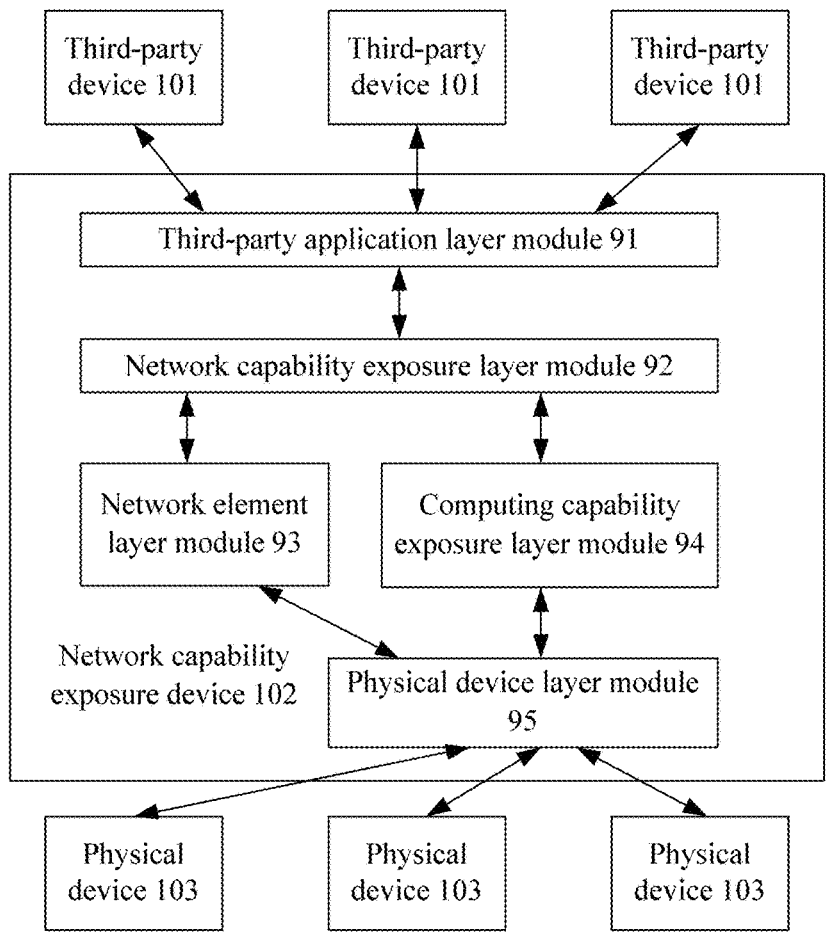
FIG. 1 is a schematic diagram illustrating the structure of a network capability exposure system according to an example of the present disclosure.

In order to make the purposes, technical solutions and advantages of the present disclosure clearer, the present disclosure is further elaborated with reference to the specific examples and the drawings in the following paragraphs.

It should be noted that, unless otherwise specified, the technical terms or scientific terms used in the examples of the present disclosure shall be understood in a usual sense by those of ordinary skill in the art. "First", "second" and the like used in the examples of the present disclosure do not indicate any order, number or importance, but are merely used to distinguish different constituent parts. "Comprises", "comprising" or other similar words imply that an element or object appearing before "comprises" or "comprising" covers enumerated elements or objects and equivalent elements thereof appearing after "comprises" or "comprising"; however, other elements or objects are not excluded. "Connection", "interconnection" and the like are not limited to physical or mechanical connection, but may include electrical connection, whether direct or indirect. "Up", "down", "left", "right" and the like are merely used to indicate a relative position relation, and when an absolute position of an object to be described changes, the relative position relation changes accordingly.

Network capability exposure refers to exposing capabilities to a third-party application via the network. The capabilities exposed to the third-party application via the network may generally include network/terminal monitoring capabilities, basic service capabilities, control capabilities and network information capabilities. The network/terminal monitoring capabilities may specifically include network congestion state, mobile state of a terminal and the like. The basic service capabilities may specifically include voice, short message, billing, and safety capabilities. The control capabilities may specifically include authentication and authorization, access control, strategy, QoS support, network slice life period management and MEC capabilities. The network information capabilities may specifically include terminal connection state, terminal position information and mega data (or big data) analysis information.

Generally, the network capability exposure may be implemented by a network capability exposure platform. One end of the network capability exposure platform may be connected to a mobile network, and the other end of the network capability exposure platform may be connected to a third-party application. Network resources and information in the mobile network therefore can be provided to the third-party application via the network capability exposure platform. In this way, differentiated services and a better user experience can be provided to users via the third-party application. In this process, the network capability exposure platform can be mainly used for internal and external information transfer and protocol conversion.

At present, the mobile network mainly provides data and parameter configurations to various network management applications of a third party via the network capability exposure platform. Further, the network management applications may perform data analysis, algorithm training, service provision, operating environment maintenance and the like. This working pattern causes a tight coupling between services and capabilities. Meanwhile, requirements of the network capability exposure in different application scenes are difficult to be met.

Based on the above reasons, examples of the present disclosure provide a network capability exposure system, through which services and capabilities can be decoupled, and various network capabilities can be exposed to third-party applications, so as to expose capabilities based on different requirements.

As shown in FIG. 1, the network capability exposure system according to examples of the present disclosure may include: at least one third-party device 101, a network capability exposure device 102, and at least one physical device 103.

According to some examples of the present disclosure, the at least one third-party device 101 may refer to a user equipment (UE) or a third-party server on which a third-party application is running. Further, the at least one physical device 103 may refer to at least one base station, at least one server, and etc.

Wherein, as shown in FIG. 1, the network capability exposure device 102 may include a third-party application layer unit 91, a network capability exposure layer unit 92, a network element layer unit 93, a computing capability exposure layer unit 94 and a physical device layer unit 95.

In the network capability exposure device 102, the network capability exposure layer unit 92 may be arranged between the network element layer unit 93 and the third-party application layer unit 91. The computing capability exposure layer unit 94 may be arranged between the physical device layer unit 95 and the network element layer unit 93.

According to some examples of the present application, the third-party application layer unit 91 may be configured to receive a service request sent by a third-party device 101 and then forward the service request to the network capability exposure layer unit 92. The third-party application layer unit 91 may further be configured to receive a network capacity from the network capability exposure layer unit 92 and then forward the network capacity to the third-party device 101.

According to some examples of the present application, the network capability exposure layer unit 92 may be configured to determine a type of a network capability required according to the service request, and then determine a computing task matching the type of the network capability required. The network capability exposure layer unit 92 may further be configured to obtain a computing resource exposure result from the computing capability exposure layer unit 94 based on the computing task, and then acquire a network capability corresponding to the type of the network capability required and the computing resource exposure result from the network element layer unit 93. After obtaining the network capability, the network capability exposure layer unit 92 may further provide the network capability to the third-party application layer unit 91.

According to some examples of the present application, the computing capability exposure layer unit 94 may be configured to determine computing resources exposed by various physical devices from the physical device layer unit 95, and then determine the computing resource exposure result according to the computing resources exposed by various physical devices and the computing task received.

According to some examples of the present application, the physical device layer unit 95 may provide an interface to the at least one physical device 103 used by the entire system. Through the physical device layer unit 95, basic computing resource capabilities may be provided to the network capability exposure device 102.

According to some examples of the present application, the network elements in the network element layer unit 93 are containerized and managed by a container management tool, such as, Kubernetes. The network element can be expanded or reduced dynamically. Moreover, the data of the network element can be obtained through an interface of the network element layer unit 93. The AI engine may continuously obtain the information of the network element from the interface of the network element layer unit 93. When a third-party application requests for network information, the network capability exposure layer unit 92 may obtain data from the AI engine and send the data to the third-party application. For network management, the container management tool can adjust the network elements dynamically. In this example, each network element is a docker, the location, number of the running nodes of the docker and the connection relationship between the dockers can be changed dynamically. If the location, number and connection relationship of the network elements change, it is equivalent to the change of the network structure, which realizes the adjustment of the network element layer 93. That is, in some examples of the present disclosure, the network element layer 93 may provide various network capacities. Therefore, the network capability exposure layer unit 92 may acquire a network capability corresponding to the type of the network capability required and the computing resource exposure result from various network capacities provided by the network element layer unit 93.

In the above example, the network capability exposure layer unit 92 may receive the service request sent by the third-party application through the third-party application layer unit 91, and expose various network capabilities required to the third-party application based on the service request.

In some examples of the present disclosure, a user may issue a service request on a UE on which a third-party application is running. For example, the service request may be a video watching request, a voice communication request or the like. Then, the UE or a third-party server (the third-party device 101) may send the service request to the network capability exposure device 102. In this case, the third-party application layer unit 91 in the network capability exposure device 102 may receive the service request. Then the network capability exposure layer unit 92 in the network capability exposure device 102 may parse the service request and obtain the type of the network capability required by the third-party device 101.

In other examples of the present disclosure, instead of sending the service request, the third-party server or the UE (the third-party device 101) may first generate a network capability exposure request based on the service request, and send the network capability exposure request to the network capability exposure device 102. In this case, the third-party application layer unit 91 in the network capability exposure device 102 may receive the network capability exposure request. Then the network capability exposure layer unit 92 in the network capability exposure device 102 may parse the network capability exposure request and obtain the type of the network capability required by the third-party device 101.

In some specific examples, the service request may include identification information corresponding to the network capability required by the third-party device 101. The type of the network capability required by the third-party device 101 may be determined according to the identification information carried in the service request.

According to some examples of the present disclosure, the type of the network capability may include any one of a network/terminal monitoring capability, a basic service capability, a control capability or a network information capability. Specifically, the network/terminal monitoring capability may include network congestion state, mobile state of the terminal and other network capabilities. The basic service capability may include voice, short message, billing, safety and other basic service capabilities. The control capability may include authentication and authorization, access control, strategy, QoS support, network slice life period management, MEC and other control capabilities. The network information capability may include terminal connection state, terminal position information, big data analysis information and other network information.

In some examples of the present disclosure, each service request can carry only one piece of identification information. In this case, the network capability exposure layer unit 92 may then determine one network capability based on the identification information and expose the network capability to the third-party device 101.

In other examples of the present disclosure, each service request may carry multiple pieces of identification information. In this case, the network capability exposure layer unit 92 may determine a combination of a plurality of network capabilities based on the multiple pieces of identification information and expose the combination of the plurality of network capabilities to the third-party device 101.

In some examples of the present disclosure, each identification information may correspond to only one network capability. In other examples of the present disclosure, each identification information may correspond to a combination of a plurality of network capabilities. In this example, each identification information may include multiple sub-identifications. Each sub-identification may correspond to at least one network capability. In this case, the network capability exposure layer unit 92 may determine the combination of multiple network capabilities based on the multiple sub-identifications.

For each service request, the network capability required by the third-party device 101 may also need a support from computing capability. Therefore, the network capability exposure layer unit 92 may further need to determine and issue a computing task matching the type of the network capability to the computing capability exposure layer unit 94. In some examples of the present disclosure, each type of the network capacity would correspond to a specific computing task which requires specific computing capacities, such as specific requirements on CPU, memory and storage medium. In this case, the computing capability exposure layer 94 may firstly determine a computing task corresponding to the type of the network capability required and then allocate the computing task to the at least one physical device 103 based on idle computing resources of the at least one physical device 103 obtained from the physical device layer unit 95 and the specific computing capability required by the computing task to obtain a computing resource exposure result. The computing capability exposure layer unit 94 may then return the computing resource exposure result to the network capability exposure layer unit 92. In this way, computing resources can be exposed by various physical devices 103. Later, the network capability exposure layer unit 92 may acquire a network capability corresponding to the type of the network capability and the computing resource exposure result from the network element layer unit 93, and then provide the network capability to the third-party device 101. It can be seen that, in the above process, a network capability exposure can be realized.

In some examples of the present disclosure, the network capability corresponding to the type of the network capability and the computing resource exposure result may include any one of computing capability, network information or network management capability.

According to the network capability exposure system disclosed by examples of the present disclosure, various kinds of network capabilities can be exposed to a third-party device to realize network capability exposure. Specifically, the network capability exposure can be realized by determining the type of network capability required by the third-party device via the network capability exposure layer unit 92, providing computing resources corresponding to the type of network capability required via the computing capability exposure layer unit 94, and providing the corresponding network capability obtained to the third-party device via the network capability exposure layer unit 92.

Figure 2:
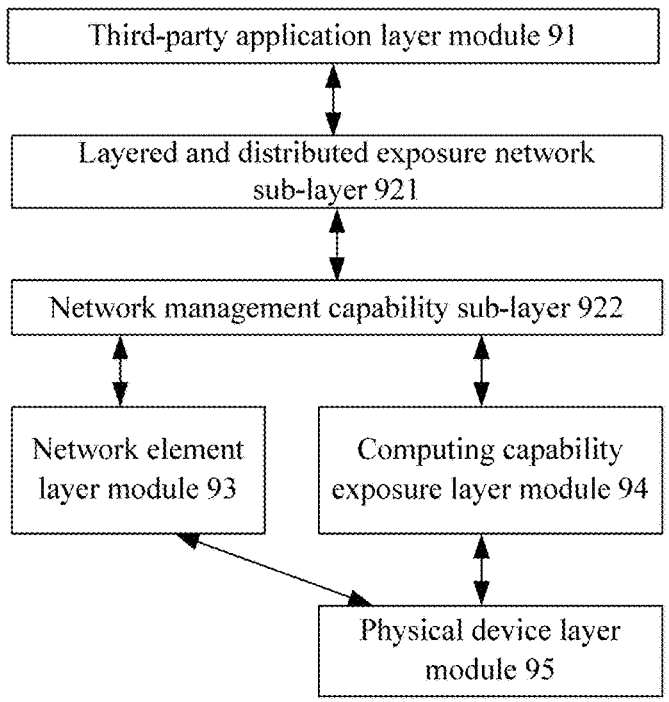
FIG. 2 is a schematic diagram illustrating the structure of a network capability exposure device according to another example of the present disclosure.

In some examples of the present disclosure, as shown in FIG. 2, the network capability exposure layer unit 92 may include: a layered and distributed exposure network sub-layer 921, and a network management capability sub-layer 922.

Figure 3:
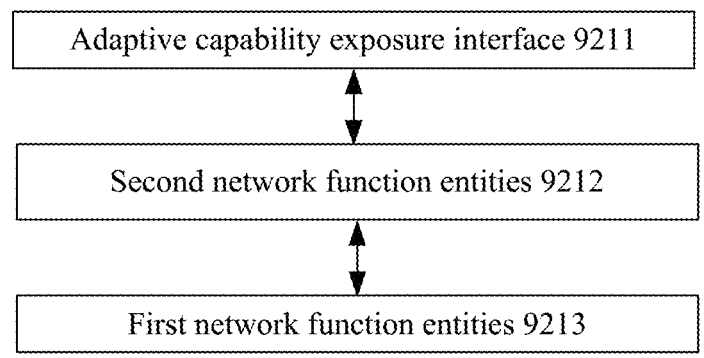
FIG. 3 is a schematic diagram illustrating the structure of the layered and distributed exposure network sub-layer according to an example of the present disclosure.

As shown in FIG. 3, the layered and distributed exposure network sub-layer 921 may include a plurality of network function entities (a plurality of second network function entities 9212 and a plurality of first network function entities 9213) and an adaptive capability exposure interface 9211.

According to some examples, the layered and distributed exposure network sub-layer 921 may be configured to implement the following functions.

In response to determining the service request is a network information acquisition request, the layered and distributed exposure network sub-layer 921 may use a scale-free network model to adjust deployment positions of network function entities (network capability exposure function, NCEF) in a network model dynamically with an objective of minimizing an average network information data acquisition time of the adaptive capability exposure interface. The layered and distributed exposure network sub-layer 921 may determine network information matching the network information acquisition request based on the adjusted network model. Then, the layered and distributed exposure network sub-layer 921 may further provide the network information to the third-party device 101 via the adaptive capability exposure interface.

In some examples of the present disclosure, the scale-free network model may be a Barabási-Albert (BA) scale-free network model, which is a scale-free network model proposed by and named after Albert-László Barabási and Réka Albert.

In the above example, when the service request sent by the third-party device 101 is a network information acquisition request, the network capability exposure device 102 may revoke a corresponding data network element from the network element layer unit 93 via the layered and distributed exposure network sub-layer 921 to provide the network information to the third-party device 101. The adaptive capability exposure interface may adjust the network capability exposure contents dynamically according to the requirements of the third-party device 101.

To be specific, the layered and distributed exposure network sub-layer 921 may provide a complicated network model. In this case, the layered and distributed exposure network sub-layer 921 may map network function nodes of the complicated network model to physical nodes of the at least one physical device 103 via a wireless network topology, and further map links of the complicated network model to physical links. In this way, the whole network model may be mapped to physical nodes and links. Further, at a preset time interval or at each time when receiving a service request or at every multiple time when receiving a service request, the mapping relationships between the network function nodes and the physical nodes, as well as the mapping relationships between the links in the network model and the physical links can be adjusted dynamically via the wireless network topology, so as to meet the service request of the system.

Specifically, when the layered and distributed exposure network sub-layer 921 receives the network information acquisition request, the scale-free network model is used for adjusting the deployment positions of the network function entities in the network model dynamically based on the dynamic adjustment of the wireless network topology. The scale-free network model is a constantly developing and evolving network model with an objective of reproducing a growth process in a true network based on growth and preferential attachment. In the scale-free network model, a small number of nodes with high degrees are called "center nodes", and the degrees of the nodes in the network are distributed in line with the power law.

According to an example of the present disclosure, selection of the deployment positions of the network function entities may be expressed as a growth process after the wireless network topology is deployed according to the needs. For example, based on the flow allocation features, the deployment positions of the network function entities are selected with the objective of minimizing the average network information data acquisition time of the adaptive capability exposure interface 9211, thereby ensuring a real-time validity to acquire data.

After the network model is adjusted, the network information data matching the network information acquisition request may be provided to the third-party application layer unit 91 via the proper adaptive capability exposure interface.

According to the technical solution provided by examples of the present disclosure, the implementation effectiveness of the exposure interface to provide data may be improved by adjusting wireless network topology mapping dynamically as well as selecting deployment positions of the network function entities and selecting the interface exposure contents.

According to some examples of the present disclosure, as shown in FIG. 3, the network function entities may include a plurality of first network function entities 9213, configured to process non-real-time network data in the network information in a centralized manner; and a plurality of second network function entities 9212, which are connected to the first network function entities 9213 in a many-to-many manner, configured to process real-time network data in the network information in a distributed manner.

According to some examples of the present disclosure, the first network function entities 9213 may be centralized level I network capability exposure function entities (C-NCEF). The first network function entities 9213 may be used for exposing non-real-time and high-level capabilities, and processing and analyzing information data within the entity function range comprehensively. For example, the first network function entities 9213 may be used to process and analyze load and time delay conditions of the management slice, total number of services and users and the like. The second network function entities 9212 may be distributed level II network capability exposure function entities (D-NCEF) deployed in a distributed manner. The second network function entities 9212 may be used for exposing real-time, near-real-time and fine-grit capabilities, the functions of which are essentially the same as the functions of the first network function entities 9213, namely processing and analyzing specific information data within the entity function range, specifically resource management on every user and individual service. For example, the second network function entities 9212 may be used to process and analyze a packet loss probability of a certain business of every customer, each QoS indicator of every user and the like.

According to some examples of the present disclosure, the first network function entities 9213 and the second network function entities 9212 may be connected in a many-to-many manner. Namely, the layered and distributed exposure network sub-layer 921 according to the present disclosure may include a plurality of first network function entities 9213 and a plurality of second network function entities 9212. Each first network function entity 9213 may be connected to one or some or all of the plurality of second network function entities 9212, and meanwhile, each second network function entity 9212 may be connected to one or some or all of the plurality of first network function entities 9213, so that the first network function entities 9213 and the second network function entities 9212 can cooperate to expose the capabilities of different requirements when the network capability matching the service request is to be obtained.

In this step, the second network function entities 9212 may process and analyze specific information data within various entity function ranges in a distributed manner, so as to realize real-time, near-real-time and fine-grit network capability exposure. The first network function entities 9213 process and analyze the non-real-time network data such as load condition and time delay condition of the network slice as well as total number of services and users in a centralized manner, so as to expose non-real-time and high-level network capabilities. Hence, when the type of the network capability included in the service request sent by the third-party device 101 include a non-real-time and high-level network capability, such as the allocation of the network slice, the first network function entities 9213 may be triggered to work. When the type of the network capability included in the service request sent by the third-party device 101 includes a real-time and fine-grit network capability such as control capability access, the second network function entities 9212 may be triggered to work. When the type of the network capability included in the service request sent by the third-party device 101 includes not only a non-real-time and high-level network capability, but also a real-time and fine-grit network capability, both the first network function entities 9213 and the second network function entities 9212 may be triggered to generate corresponding network capabilities exposed to the third-party device 101.

According to the network capability exposure device 102 in examples of the present disclosure, the first network function entities 9213 and the second network function entities 9212 may cooperate in a cross-layer manner to process different network capabilities deployed with two levels of network function entities, thereby exposing multi-aspect network capabilities to the third-party device 101. Meanwhile, network capability exposure functions, including data analysis, algorithm training, service provision and operating environment maintenance, can be implemented by at least one of the first network function entities and the second network function entities, so that the services and the capabilities are highly decoupled and independent from each other. In this way, not only fine-grit architecture resources can be scheduled according to the needs, but also more network capabilities can be exposed to meet the capability exposure requirements in different scenes.

In some examples of the present disclosure, as shown in FIG. 2, the network capability exposure layer unit 92 may further include a network management capability sub-layer 922 which is arranged between the layered and distributed exposure network sub-layer 921 and the network element layer unit 93. The network management capability sub-layer 922 may include an artificial intelligence (AI) engine for network capability exposure. The AI engine may include a feature extractor and a neural network model trainer. Through the AI engine, a pre-trained neural network model and a machine learning mechanism may be provided to the third-party application layer unit 91.

The network management capability sub-layer 922 is configured to acquire network state information, and pre-train a network management capability exposure model based on the network state information. Specifically, in response to determining the service request is a network management capability exposure request, the network management capability sub-layer 922 may provide a network management capability matching the network management capability exposure request to the third-party device 101 based on the network management capability exposure request and the trained network management capability exposure model.

According to some examples of the present disclosure, state information of the network can be acquired by a data acquisition interface of the AI engine. The state data may include: network indicators such as network rate, bandwidth, throughput capacity and etc., physical device information such as idle resources of various physical devices, interface state and etc., UE information and historical data of user services. After data acquisition, the AI engine may clean the state data acquired, discover and correct identifiable errors in the state data, thereby obtaining network state information. Specifically, the network state information may be measured by a programmable interface. Then dynamic components can be extracted from the network state information. Further, the dynamic components can be processed by the feature extractor of the AI engine to obtain feature information. In this way, global fine-grit network state data input can be obtained for subsequent data processing by the AI engine.

After the network state information is acquired, the network management capability exposure model can be pre-trained based on the network state information. Optionally, based on the feature information in the network state information, training may be conducted by a plurality of AI algorithms to forecast and analyze network indicators, service features and user behaviors, and store in the AI engine, so that the AI engine may adjust the network resource allocation better to improve the network performance based on a more precise forecasting.

Upon training, the network management capability matching the network management capability exposure request may be provided to the third-party application 91 according to the network management capability exposure request and the trained network management capability exposure model. Moreover, historical data of a specific user, network history state information and specific data processing capability can be provided to the third-party application layer unit 91 to realize the network capability exposure.

In some optional examples of the present disclosure, the network management capability exposure request may include a network slice management request. The network slice may be specifically managed by the AI engine in the network management capability sub-layer 922. During the intelligent management on the network slice, the network management capability sub-layer 922 may be configured to manage the network slice based on a double deep Q-learning (DDQL) model. Further, the DDQL network model may be optimized by the experience replay method.

The DDQL network model may include a pre-built evaluation network and a pre-built target network. In this model, a motion of an intelligent agent may be determined by the evaluation network, a target Q value corresponding to the motion can be calculated by the target network, and an excessive estimation can be eliminated by decoupling the selection of the motion corresponding to the Q value and the calculation of the target Q. The evaluation network and the target network may be neural networks. In the example, firstly, the intelligent agent explores environment by randomly taking actions and storing experiences obtained in the target network. Secondly, an experience replay mechanism is utilized to sample a small batch of data of the target network randomly, so as to break an observation sequence correlation. Finally, the sample of the target network renews weights of the DDQL network model according to a mean square error of a Q function between the DDQL network model and the target network. At last, weights of the natural network can be obtained by a stochastic gradient descent.

In some optional examples, the management network slice based on the DDQL network model may include allocation of physical resource blocks (PRB) in downlink resource scheduling in a network slice scene. Namely, the network slice management request may include a resource block allocation request.

When the physical resource blocks are allocated, the network management capability sub-layer 922 may be configured to: initialize each base station among the at least one physical device 103 as an intelligent agent, so as to obtain a plurality of user equipment (UE) corresponding to the physical resource block allocation request, wherein a state of the intelligent agent is associated with a target rate of each UE; determine an immediate reward of the DDQL network model based on the target rate of each UE and the number of allocated resource blocks, and determine a target Q value of the DDQL network model based on the immediate reward; and in response to the convergence of the DDQL network model, obtain a resource block allocation result.

In some examples of the present disclosure, the service request sent by the third-party device 101 may include resource block allocation requests from a plurality of UE. In this case, 25 PRBs in each sub-frame may be allocated to the plurality of UE within a transmission time interval (TTI) in the course of scheduling a downlink transmission resource at 5 MHz-25PRB. Implementation process of the downlink transmission resource schedule may include the following steps.

In the DDQL network model, a physical device, such as a base station, can be initialized as an intelligent agent. In this case, a state space S of the intelligent agent is associated with the target rate r of each UE, namely $S(t)=\{r_i(t), i=1, 2, 3, 4\}$, where $r_i$ refers to the target rate of the i UE. Further, a motion space A of the intelligent agent may be set as [[1, 0, 0, 0], [0, 1, 0, 0], [0, 0, 1, 0], [0, 0, 0, 1]], wherein, "1" expresses that the corresponding UE needs to be allocated one resource block again. In a reward function, the immediate reward is associated with whether the UE reaches the target rate and the total number R of the allocated resource blocks, that is, $$\sum_{i=1}^{4} R_i \leq 100, \qquad 1)$$

$R_i$ is the resource block allocated for the $i^{th}$ UE, and 2) whether $r_i <= r$. In response to determining the UE meets the target rate, the immediate reward is set as −1; otherwise, the immediate reward is set as 1.

In some examples of the present disclosure, an optimization objective is to minimize an absolute value of a difference between a current rate of each UE and the target rate thereof when the UE meets the speed requirement. For example, assuming that a certain service request is a voice communication request, a required network bandwidth speed of the voice communication request is 1 mbps, and the network bandwidth (namely the target rate) desired by each UE is 2 mbps, the optimization objective in the example may include: the current rate of each UE needs to be greater than 1 mbps and the absolute value between the current rate and the target rate (2 mbps) is minimal.

Optionally, the target rate of each UE may refer to an air interface downlink rate of the UE.

In some examples of the present disclosure, the process of allocating physical resource blocks (PRB) in the downlink resource scheduling by the DDQL network model in the network slice scene may include the following steps.

In S101, various parameters within two neural networks (namely the evaluation network and the target network), parameters of wireless devices and UE, and environmental information of the intelligent agent are initialized.

Wherein, various parameters within two neural networks may include a network parameter θ of the evaluation network and a network parameter θ' of the target network. The parameters of wireless devices and UE may include maximum PRB allocation number of the base station. The environmental information of the intelligent agent may include motion, state and replay experience pool D of the intelligent agent.

In S102, the intelligent agent selects a motion according to a current state (namely the target rate of each UE).

Wherein, the motion selected by the intelligent agent in the above block may include a selection of number of resource blocks for different kinds of UE. In this example, the selection of the motion of the intelligent agent may depend on a magnitude of the Q value caused by a resource allocation strategy taken under the current state. Specifically, the intelligent agent may calculate a target Q value via the target network, and select a motion corresponding to a maximum Q value as a decided motion under the current state.

In S103, resource blocks are allocated for the UEs and the current rate of each corresponding UE is calculated.

In this way, interactions between the intelligent agent and the environment can be realized. Further, the immediate reward obtained thereof can be calculated according to an interaction result between the intelligent agent and the environment. Then, a next state of the system can be obtained depending on a state transition probability. Finally, experiences (including historical state, motion and reward) are stored into an experience pool. In a later learning process, taking a small-batch sample random sampling from the experiences stored in the experience pool for learning by virtue of the experience replay method, so as to reduce the correlation between the data.

In some examples of the present disclosure, when the experience replay is conducted, any one of a central replay, a distributed replay, a uniform replay or a preferential replay may be applied to eliminate data correlation, decrease parameter renewing variance and accelerate convergence. Meanwhile, the experience may be used repeatedly to ensure a model training effect when data can be obtained difficultly.

In S104, whether the number of experiences stored in the experience pool satisfies the requirement is determined.

In response to determining that the number of experiences stored in the experience pool satisfies the requirement, a deep reinforcement learning may be performed, and iteration times of the deep reinforcement learning may be determined according to the number of the experiences stored in the experience pool.

In S105, a learning is performed based on the DDQL network model, and the immediate reward is calculated according to a bellman equation. Then a motion of the intelligent agent is determined via the evaluation network, and the target Q value corresponding to the motion is calculated via the target network, so as to eliminate an overestimation in the DQN.

In S106, in the course of learning and training, the rewards in the system may decrease continuously. The optimization process of PRB resource distribution may be terminated when the model tends to converge. That is, when the model tends to converge, a long-term reward function would not change within a certain range, which indicates that the system has obtained an optimal resource block allocation result.

In the above example, a motion value function of the DDQL network model, namely, a calculation function $y^{Double\ DQN}$ of the target Q value, may be expressed as the following.

$$y^{Double\ DQN} = r' + \gamma Q'(s_{t+1}, a^*; \theta'), a^* = \arg\max Q(s', a; \theta)$$

Where, r' expresses the immediate reward; $\gamma \in [0,1]$ expresses a discount factor; Q' expresses the target network; $s_{t+1}$ expresses a next state of the intelligent agent; a* expresses the motion selected by the intelligent agent; θ' expresses the network parameters of the target network; Q expresses the evaluation network; s' expresses the current state of the intelligent agent; θ expresses the network parameters of the evaluation network.

An infinite reward in a Markovian decision process can be avoided by the above method disclosed.

In other examples of the present disclosure, for the purpose of further optimizing the DDQL network model, a dueling DQL algorithm and an asynchronous advantage actor-critic (A3C) algorithm may be used for optimizing the model. Specifically, the network management capability sub-layer 922 may be configured to take a dueling DQL algorithm and an A3C algorithm to optimize the neural networks of the DDQL network model.

The dueling DQL algorithm may divide the Q network into a value function part and an advantage function part. The value function part is merely associated with an environment state s of the intelligent agent, and irrelevant to a motion a specifically taken. However, the advantage function part is simultaneously associated with the state s and the motion a.

Therefore, when the dueling DQL algorithm optimizes the DDQL network model, the value function part may be determined based on the state s of the intelligent agent, wherein a network output of the value function part may include V(s, θ⁻, α), wherein, θ⁻ expresses a natural network parameter of a common part shared by the value function part and the advantage function part, α expresses an exclusive network parameter of the value function part. Further, the advantage function part may be determined based on the state s and the motion a of the intelligent agent, wherein the network output of the advantage function part may include A(s, a, θ⁻, β), wherein, β expresses an exclusive network parameter of the advantage function part. Finally, a value function of the DDQL network model may be obtained by virtue of a liner combination of the network outputs of the value function part and the advantage function part, namely:

$$Q(s,a,\theta^-,\alpha,\beta) = V(s,\theta^-,\alpha) + A(s,a,\theta^-,\beta)$$

Further, a central processing for the advantage function part may be performed, that is, $$Q(s, a, \theta^-, \alpha, \beta) = V(s, \theta^-, \alpha) + \left(A(s, a, \theta^-, \beta) - \frac{1}{A}\sum_{\alpha' \in A} A(s, \alpha', \theta^-, \beta)\right)$$

Where, α' expresses the selected motion of the intelligent agent.

Secondly, the A3C algorithm may be used to optimize the structure of the DDQL network model. Specifically, a multi-thread method using the A3C and an asynchronous learning framework may be used in combination with the actor-critic network mechanism to reduce the correlation of the replay experience data of the DDQL network model, so as to improve a training effect.

Figure 4:
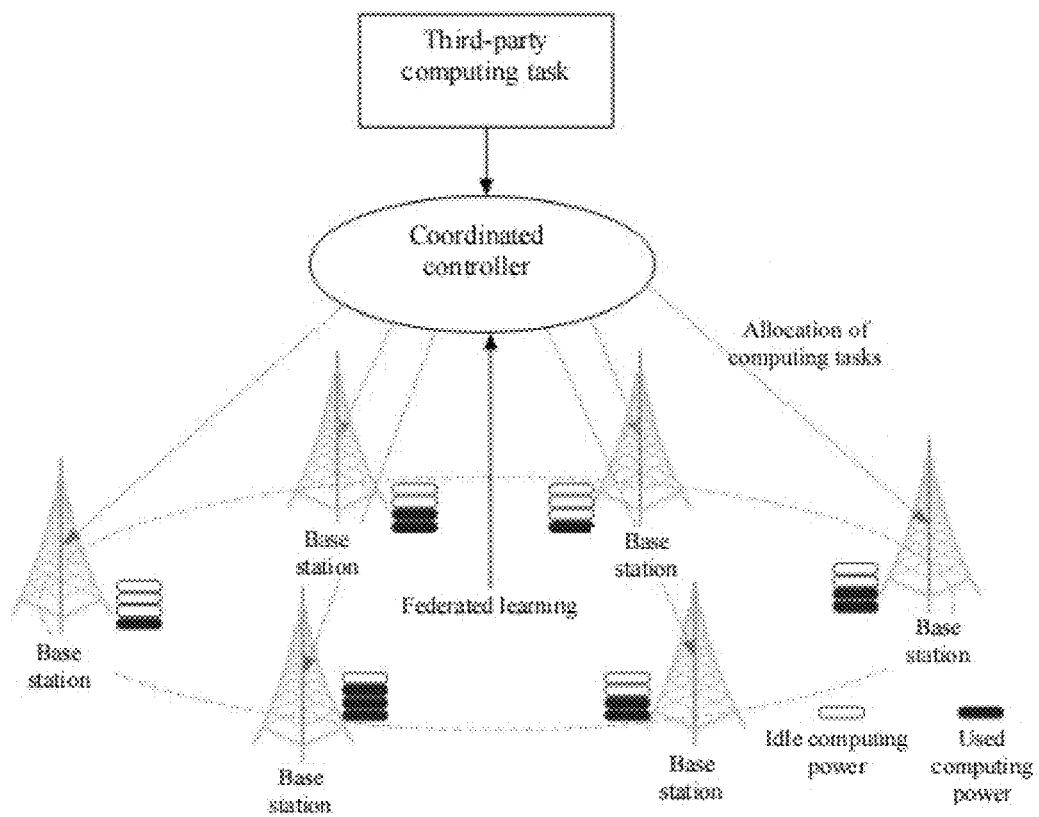
FIG. 4 is a schematic diagram of illustrating the structure of the computing capability exposure layer according to an example of the present disclosure.

In other examples of the present disclosure, the computing capability exposure layer unit 94 may include a coordinated controller. As shown in FIG. 4, the coordinated controller is connected to the plurality of physical devices in the physical device layer unit 95. The coordinated controller is configured to: acquire idle computing capabilities of the at least one physical device; allocate the computing task to the at least one physical device based on a distributed federated learning method and the idle computing capabilities to enable the at least one physical device to conduct cooperative computing; and generate a computing resource exposure result according to allocations of the computing task among the at least one physical device.

Due to the decoupling of hardware from functions in an open-source wireless network, a universal processing server, such as a 5G macro station, a 5G micro station, a border gateway or a core network element, can be realized by a corresponding software performed on a server. Thereby, ubiquitous distributed computing resources may be obtained. Computing capabilities available in a base station may changes with the services carried. Hence, when the computing capabilities of a single site is unable to meet computing resource requirements of an upper application steadily, the cooperative computing may be conducted by a plurality of distributed sites. A computing capability cluster may be formed by sites in adjacent areas. Requirements on computing resources of an upper application then can be allocated to different base stations via the federated learning mechanism to dynamically coordinate the protocol processing of all sites and the allocation of the computing resources for the upper applications, thereby ensuring a dynamic computing capability exposure of the open-source wireless network.

In examples of the present disclosure, the computing capability exposure layer unit 94 exposes the computing capability by the distributed federated learning algorithm. The coordinated controller makes an overall planning for the allocation of the global computing tasks, and meanwhile serves as a parameter server in the federated learning mechanism to deliver and converge a global computing task allocation model and train the global computing task allocation model.

When the computing capability exposure layer unit 94 receives computing tasks included in the service request sent by the third-party device 101, the coordinated controller may compute the computing tasks to be allocated to each base station site according to the idle computing capabilities of each base station site and the distributed federated learning. Then, the coordinated controller may distribute the computing tasks to each base station site. Each base station site uses its idle computing resource to process the computing task allocated for sake of for cooperative computing. Each base station site then feeds back a calculation result to the coordinated controller for aggregation to finish the total computing tasks. The coordinated controller may generate a final computing resource exposure result. Hence, distributed idle computing capabilities may be effectively aggregated to effectively improve a utilization efficiency of computing resources in the open-source wireless network.

In some examples of the present disclosure, assuming that a computing task with a data size $d_j$ ($0 \leq d_j \leq D$ is the total data size of computing tasks) is allocated, by the coordinated controller p, to the site j (j=1, 2, ..., J, J is the number of base station sites participating in cooperative computing), a transmission rate from the coordinated controller p to the site j is $v_{p,j}$, and a transmission delay from the coordinated controller p to the site j is $$T'_{p,j} = \frac{d_j}{v_{p,j}}.$$

According to the transmission delay, the corresponding transmission energy consumption may be calculated as $E_{p,j}{}^t = p_{p,j}{}^t \cdot T_{p,j}{}^t$, where $p_{p,j}{}^t$ represent a transmission power from the coordinated controller p to the site j within a unit time. After the computing task is transmitted to the base station site, idle computing resources $c_j$ (such as remaining CPU and memory) of the site within the unit time may be utilized. In this case, the time of computing the allocated computing task by the site may be calculated as $$T_j^c = \frac{d_j}{c_j},$$

and the energy consumption of the site in this computing process may be calculated as $E_j^c = p_j^c \cdot T_j^c$. After the calculations are done, the site may return the computing result to the coordinated controller p. In this case, the transmission delay of transmitting the computing result to the coordinated controller p by the site may be calculated as $$T'_{j,p} = \frac{d_j^r}{v_{j,p}},$$

where $v_{j,p}$ represents a transmission rate from the base station site j to the coordinated controller p, $v_{j,p}$ is not certainly equal to $v_{p,j}$, $d_j^r$ is the data size of the returned computing result, and a relation between $d_j^r$ and $d_j$ is known. Thus, the corresponding transmission energy consumption would be calculated as $E_{j,p}{}^t = p_{j,p}{}^t \cdot T_{j,p}{}^t$, where $p_{j,p}{}^t$ represents the transmission power from the site j to the coordinated controller p within the unit time, and $p_{j,p}{}^t$ is not certainly equal to $p_{p,j}{}^t$. Hence, the total time for receiving the computing result may be $T_j = T_{p,j}{}^t + T_j^c + T_{j,p}{}^t$ after the coordinated controller p allocates the computing tasks to the site j. In this course, a waiting energy consumption of the coordinated controller p may be $E_p^{w,j} = p_p^w \cdot T_j$. Accordingly, the total energy consumption for receiving the computing result may be $E_j = E_{p,j}{}^t + E_j^c + E_{j,p}{}^t$; after the coordinated controller p allocates the computing tasks to the site j.

In some other examples of the present disclosure, the coordinated controller may be configured to: allocate computing tasks with an optimization objective of minimizing energy and time consumed by all the computing tasks.

The time delay and the energy consumption are two core indicators to measure the network performance, the optimization objective mainly focuses on the time and the energy consumption for performing all the computing tasks. Specially, the optimization objective is to minimize a weight sum of the time delay and the energy consumption for performing all the computing tasks, namely, to minimize a total cost C calculated via the following equations (1)-(3).

$$\min C = \min \alpha \sum_{j=1}^{J} T_j + (1-\alpha) \sum_{j=1}^{J} E_j \quad (1)$$

s.t.

$$\sum_{j=1}^{J} d_j = D \quad (2)$$

$$\max\{T_j \mid j = 1, 2, \ldots, J\} \leq T_{tol} \quad (3)$$

Where, α expresses the weight of the processing time cost of the computing tasks and 1−α expresses the weight of energy consumption cost of the computing tasks, wherein, α∈(0,1). In the foregoing example, an objective function (1) is the minimal weight sum of the completion time of all computing tasks and the energy consumption of a user end, which is expressed as a total cost C. A constraint condition (2) expresses that a sum of the task sizes allocated by all base station sites shall be equal to the total computing task size. A constraint condition (3) expresses that a maximum tolerable computing time $T_{tol}$ needs to meet a third-party computing task request.

Figure 5:
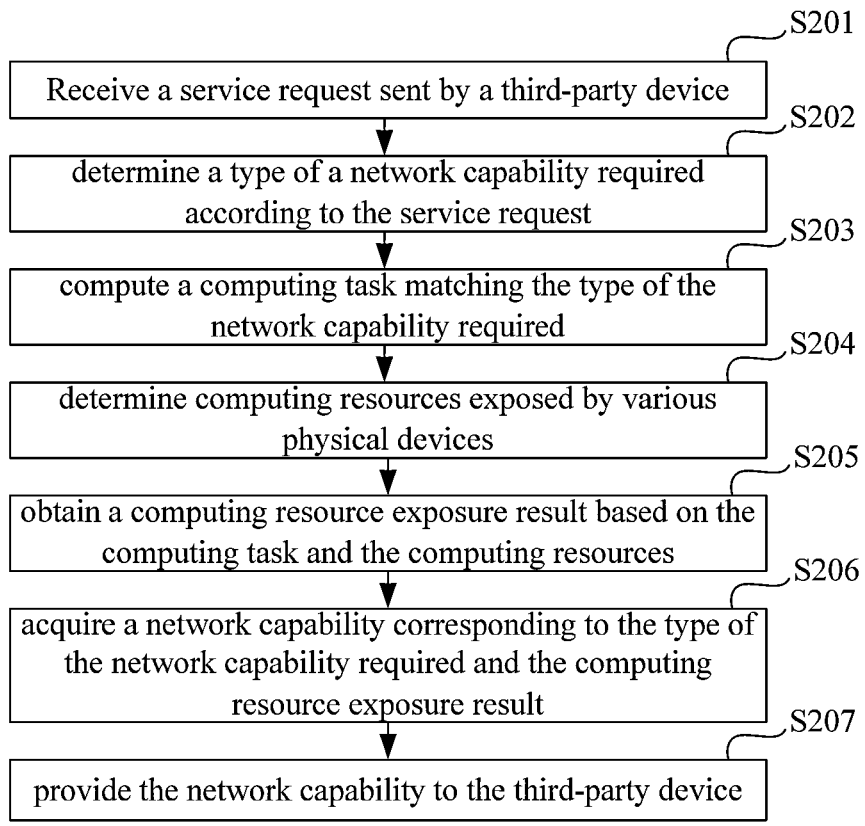
FIG. 5 is a flow chart of a network capability exposure method according to an example of the present disclosure.

Based on the same inventive concept, corresponding to the device in any one of the foregoing examples, the present application discloses a network capability exposure method applied to the network capability exposure device 102, wherein the network capability exposure device 102 includes a physical device layer unit 95, a computing capability exposure layer unit 94, a network element layer unit 93, a network capability exposure layer unit 92 and a third-party application layer unit 91. As shown in FIG. 5, the network capability exposure method may include the following steps.

In block S201, the network capability exposure device 102 receives a service request sent by a third-party device 101.

In block S202, the network capability exposure device 102 determines a type of a network capability required according to the service request.

In block S203, the network capability exposure device 102 computes a computing task matching the type of the network capability required.

In block S204, the network capability exposure device 102 determines computing resources exposed by various physical devices 103.

In block S205, the network capability exposure device 102 obtains a computing resource exposure result based on the computing task and the computing resources exposed by various physical devices 103.

In block S206, the network capability exposure device 102 acquires network capabilities corresponding to the type of the network capability required and the computing resource exposure result.

In block S207, the network capability exposure device 102 provides the network capabilities to the third-party device 101.

In some examples of the present disclosure, the network capability exposure device 102 may receive the service request sent by the third-party device 101 via the third-party application layer unit 91, and expose various network capabilities required to the third-party device 101 based on the service request.

In this method, the user may issue various service requests on the UE. Then, a service request may be sent to the network capability exposure device 102 through a server of the third-party application or a software of the third-party application (the third-party device 101). Then, the network capability exposure device 102 may receive and parse the service request, and obtain the type of the network capability required by the third-party application.

When the network capability exposure device 102 provides the network capability required by the third-party device 101, a corresponding computing capability may be further provided. Hence, the network capability exposure layer unit 92 in the network capability exposure device 102 further needs to obtain and issue a computing task matching the type of the network capability required to the computing capability exposure layer unit 94. The computing capability exposure layer unit 94 may allocate the computing task based on idle computing resources of various physical devices 103 obtained through the physical device layer unit 95, thereby obtaining the computing resources that can be exposed by the various physical devices 103. Then, the computing capability exposure layer unit 94 may return a computing resource exposure result to the network capability exposure layer unit 92. Finally, the network capability exposure layer unit 92 may acquire, from the network element layer unit 93, network capabilities corresponding to the type of the network capability required and the computing resource exposure result. Moreover, the network capability exposure layer unit 92 may return the network capabilities acquired to the third-party device 101 via the third-party application layer unit 91. Through the above process, the network capability exposure may be realized.

Figure 6:
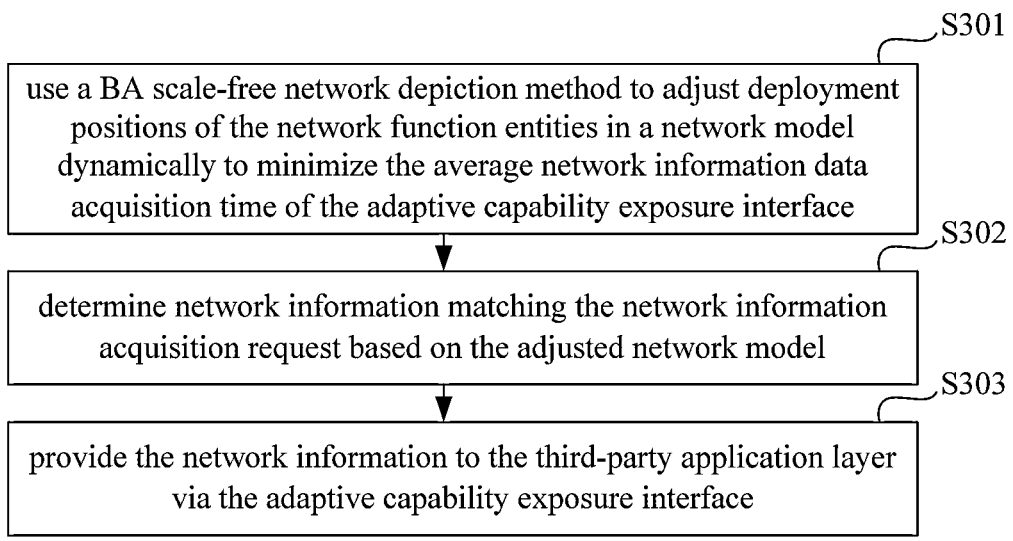
FIG. 6 is a flow chart of a network capability exposure method according to another example of the present disclosure.

In some examples of the present disclosure, as shown in FIG. 2, the network capability exposure layer unit 92 may include a layered and distributed exposure network sub-layer 921. As shown in FIG. 3, the layered and distributed exposure network sub-layer may include a plurality of network function entities and an adaptive capability exposure interface 9211. As shown in FIG. 6, the layered and distributed exposure network sub-layer 921 is configured to perform the following steps.

In block S301, in response to determining the service request is a network information acquisition request, the layered and distributed exposure network sub-layer 921 uses a scale-free network model to adjust deployment positions of the network function entities in a network model dynamically to minimize the average network information data acquisition time of the adaptive capability exposure interface.

In some examples of the present disclosure, the scale-free network model may be a BA scale-free network model.

In this example, the layered and distributed exposure network sub-layer 921 may provide a complicated network model. In this case, the layered and distributed exposure network sub-layer 921 may map network function nodes in the complicated network model to physical nodes among the physical devices 103 via a wireless network topology, and also map links in the complicated network model to physical links. Therefore, the whole network model mapping can be realized via node and link mapping. Further, at a preset time interval or at each time or at every multiple times when the service request is received, mapping relations between the network function nodes and the physical nodes, as well as, mapping relations between the links in the network model and the physical links are adjusted dynamically via the wireless network topology, so as to meet the service request of the system.

When the layered and distributed exposure network sub-layer 921 receives the network information acquisition request, the scale-free network model is used for adjusting the deployment positions of the network function entities in the network model dynamically based on the dynamic adjustment of the wireless network topology. In this way, the structure of the network model can be adjusted dynamically.

In block S302, the layered and distributed exposure network sub-layer 921 determines network information matching the network information acquisition request based on the adjusted network model.

After the network model is adjusted, the network information matching the network information acquisition request can be determined.

In block S303, the layered and distributed exposure network sub-layer 921 provides the network information to the third-party application layer 91 via the adaptive capability exposure interface.

As shown in FIG. 3, the network function entities include a plurality of first network function entities 9213, configured to process non-real-time network data in the network information data in a centralized manner. The network function entities further include a plurality of second network function entities 9212, which are connected to the first network function entities 9213 in a many-to-many manner, and configured to process real-time network data in the network information data in a distributed manner.

In other examples of the present disclosure, the network capability exposure layer unit 92 may further include a network management capability sub-layer 922 which is arranged between the layered and distributed exposure network sub-layer 921 and the network element layer unit 93.

Figure 7:
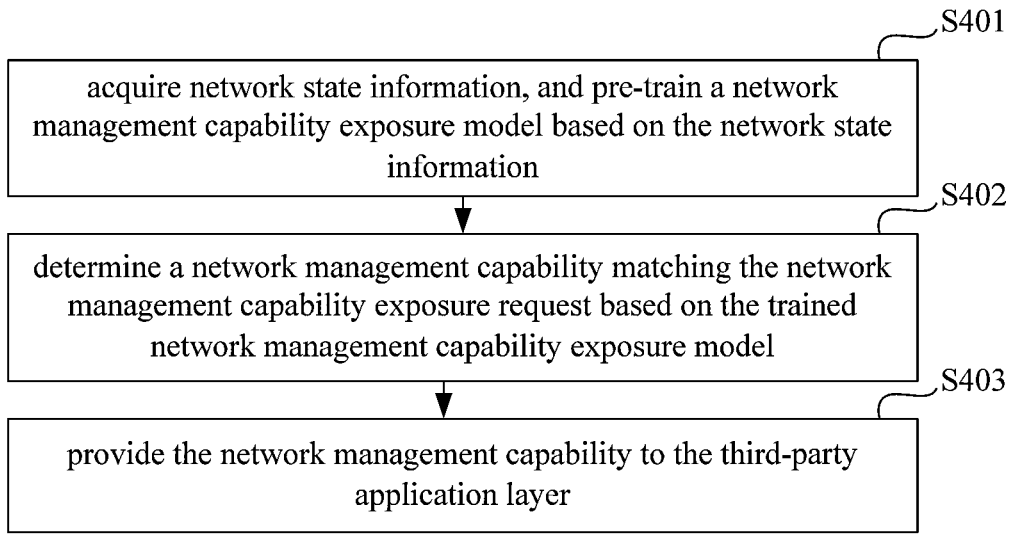
FIG. 7 is a flow chart of a network capability exposure method according to yet another example of the present disclosure.

As shown in FIG. 7, the network management capability sub-layer 922 is configured to perform the following steps.

In block S401, the network management capability sub-layer 922 acquires network state information, and pre-train a network management capability exposure model based on the network state information.

According to some examples of the present disclosure, the information data in the network may be acquired via a data acquisition interface of an AI engine in the network management capability sub-layer 922. The information data in the network may include network indicators, physical device information, UE information and historical data of user services. Wherein, the network indicators may include network rate, bandwidth, throughput capacity and the like. The physical device information may include idle resources of various physical devices, interface state and the like. After data acquisition, the AI engine may clean the data acquired, discover identifiable errors in the data and correct the identifiable errors. In this way, the network state information can be obtained. Optionally, the network state information may be measured by a programmable interface. Then dynamic components can be extracted from the network state information. Further the dynamic components can be processed by a feature extractor in the AI engine to obtain the feature information. In this way, a global fine-grit network state data input may be obtained for subsequent data processing by the AI engine.

After the network state information is acquired, a training may be conducted by a plurality of artificial intelligence algorithms based on the feature information in the network state information to forecast and analyze network indicators, service features and user behaviors. And the results may be stored in the AI engine.

In block S402, in response to determining the service request is a network management capability exposure request, the network management capability sub-layer 922 determines a network management capability matching the network management capability exposure request based on the network management capability exposure request and the trained network management capability exposure model.

In block S403, the network management capability sub-layer 922 provides the network management capability to the third-party application layer unit 91.

Upon training, the network management capability matching the network management capability exposure request may be provided to the third-party device 101 according to the network management capability exposure request and the trained network management capability exposure model. Moreover, historical data of a specific user, network history state information and specific data processing capability are also provided to the third-party device 101 to realize the network capability exposure.

Figure 8:
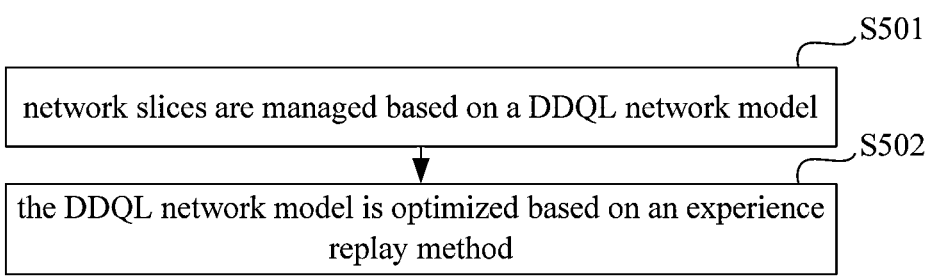
FIG. 8 is a flow chart of a slice management method according to an example of the present disclosure.

In some examples of the present disclosure, the network management capability exposure request may include a network slice management request. As shown in FIG. 8, the network capability exposure method may further include the following steps.

In block S501, network slices are managed based on a double deep Q-learning (DDQL) network model.

In block S502, the DDQL network model is optimized based on an experience replay method.

In this example, a base station may be used as an intelligent agent. In this process, firstly, the intelligent agent may explore the environment by taking actions randomly to obtain experiences and store the experiences in the target network. Secondly, an experience replay mechanism may be utilized to sample a small batch of data of the target network randomly, so as to break an observation sequence correlation. Finally, the sample of the target network renews weights of the DDQL network model by virtue of a mean square error of a Q function between the DDQL network model and the target network, and the weights of the natural network may be obtained by a stochastic gradient descent.

Optionally, the network slice management request may include a resource block allocation request. In this case, the method may further include the following steps.

In S601, each base station is initialized as an intelligent agent through the physical device layer unit 95. Further, a plurality of user equipment (UE) corresponding to the physical resource block allocation request are obtained, wherein the state of an intelligent agent is associated with the target rate of a UE.

In S602, an immediate reward of the DDQL network model is determined based on the target rate of the UE and the number of resource blocks to be allocated. Then, a target Q value of the DDQL network model is determined based on the immediate reward.

In 603, a resource block allocation result is obtained as the DDQL network model converges.

Figure 9:
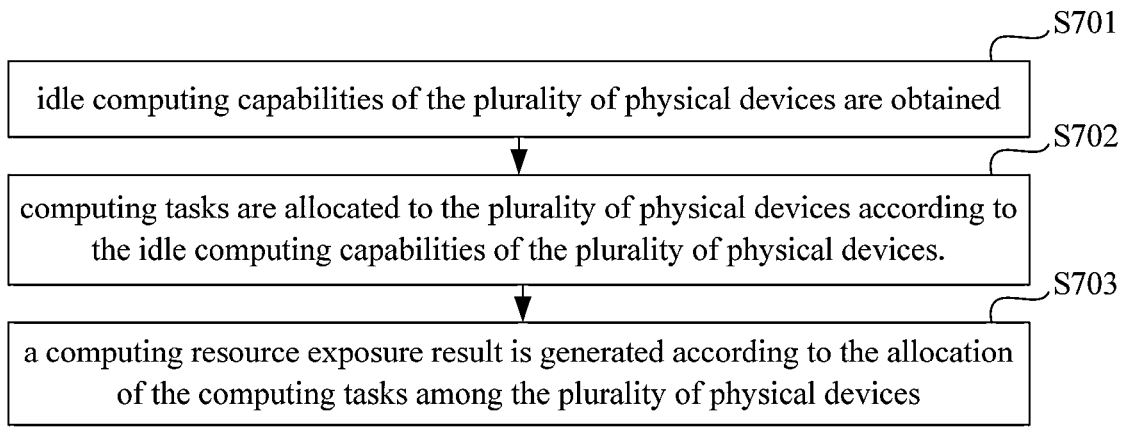
FIG. 9 is a flow chart of a computing capability exposure method according to an example of the present disclosure.

In other examples of the present disclosure, the computing capability exposure layer unit 94 may include a coordinated controller connected to the plurality of physical devices in the physical device layer unit 95. As shown in FIG. 9, the method may further include the following steps.

In block S701, idle computing capabilities of the plurality of physical devices are obtained.

In block S702, computing tasks are allocated to the plurality of physical devices according to the idle computing capabilities of the plurality of physical devices.

In block S703, a computing resource exposure result is generated according to the allocation of the computing tasks among the plurality of physical devices.

Optionally, the method may further include: the computing tasks are allocated with an optimization objective of minimizing energy and time consumed by all computing tasks.

In some examples of the present disclosure, the requirements on computing resources of an upper application are allocated to different base stations via the federated learning mechanism to allocate computing resources dynamically among all sites, thereby ensuring the dynamic computing capability and exposing the distributed computing capability of the open-source wireless network.

The above paragraphs depict the specific examples of the description. Other examples are within the scope of the appended claims. In some conditions, the motions or steps described in the claims may be conducted in different orders in the examples and may still realize the desired result. In addition, the process described in the drawings does not necessarily need to show the specific or continuous sequence to realize the desired result. In some examples, multi-task processing and parallel processing may be also feasible or favorable.

The method of the foregoing examples is based upon the system in the foregoing examples, and has the beneficial effects of the corresponding system, so the beneficial effects are not repeated in detail.

Based on the same inventive concept, the present disclosure further provides an electronic device, comprising a memory, a processor and a computer program which is stored on the memory and can operate on the processor, wherein the network capability exposure method according to any one of examples is implemented when the processor executes the program.

Figure 10:
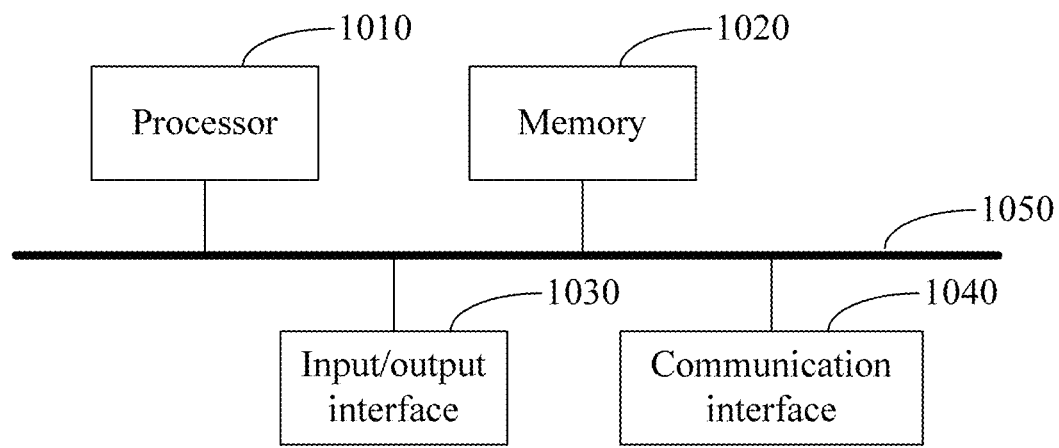
FIG. 10 is a schematic diagram illustrating the structure of an electronic device according to an example of the present disclosure.

FIG. 10 illustrates a more detailed structural schematic diagram of electronic device hardware provided by the example, the device may comprise a processor 1010, a memory 1020, an input/output (I/O) interface 1030, a communication interface 1040 and a bus 1050. The processor 1010, the memory 1020, the I/O interface 1030 and the communication interface 1040 are in a communication connection with each other within the device via the bus 1050.

The processor 1010 may execute the relevant procedures by virtue of a general central processing unit (CPU), a microprocessor, an application specific integrated circuit (ASIC), or one or more integrated circuits, so as to implement the technical solution provided by the examples of the description.

The memory 1020 may be implemented by a read only memory (ROM), a random-access memory (RAM), a static memory device and a dynamic memory device, etc. The memory 1020 may store an operating system and other application procedures; when the technical solution provided by the example of the Description is implemented via the software or the hardware, the related procedure codes are stored in the memory 1020 and revoked by the processor 1010.

The I/O interface 1030 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1040 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1050 includes a passage which transmits information among various components (for example, the processor 1010, the memory 1020, the I/O interface 1030 and the communication interface 1040) on the device.

It should be noted that, although the above-mentioned device merely shows the processor 1010, the memory 1020, the I/O interface 1030, the communication interface 1040 and the bus 1050, the device may further include other components required by the normal operation in the specific implementation process. Besides, those skilled in the art could appreciate that the above-mentioned device may merely include the components required by the solution in the examples of the Description, but not necessarily include all components shown in the figure.

The electronic device according to the foregoing examples s is used for implementing the corresponding network capability exposure method in any one of the foregoing examples, and has the beneficial effects of the corresponding method examples, which are not repeated in detail.

Based on the same inventive concept, the present disclosure further provides a computer system applicable to a method for implementing the network exposure function method corresponding to the method in any one of examples.

Figure 11:
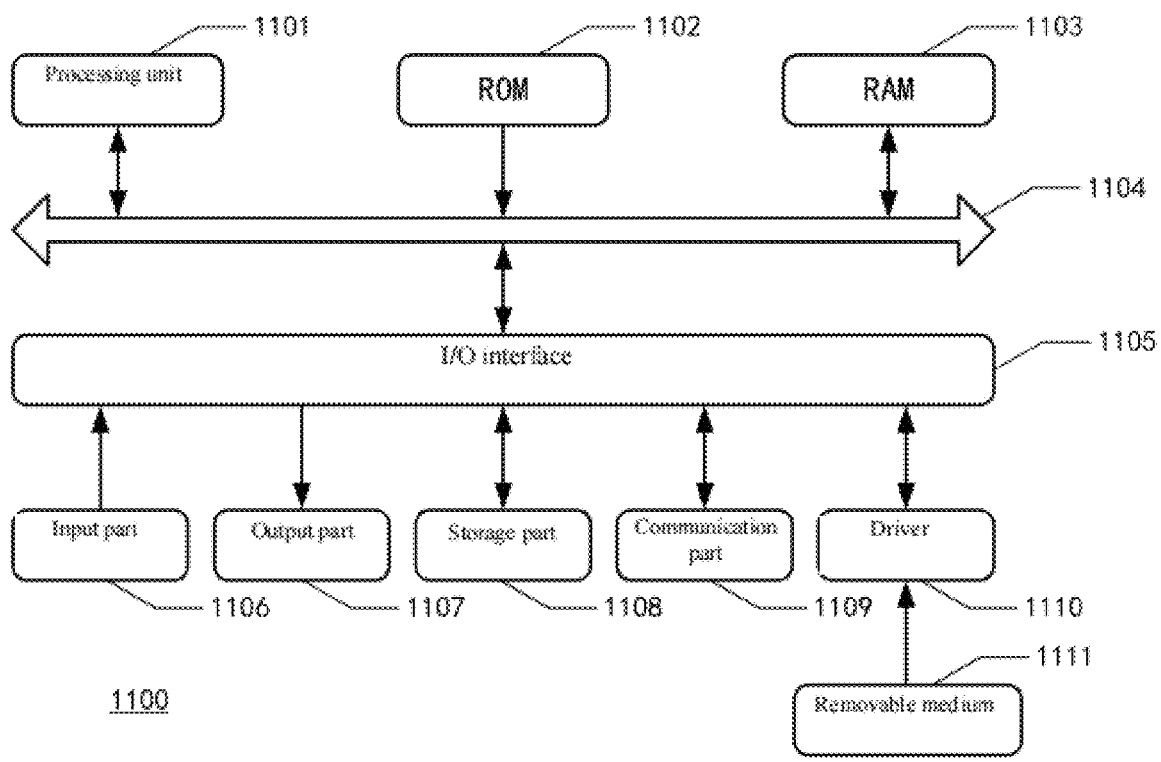
FIG. 11 is a schematic diagram illustrating an example of the present disclosure.

As shown in FIG. 11, a computer system 1100 comprises a processing unit 1101, which may execute various kinds of processing in the foregoing examples according to the procedures stored in a read only memory (ROM) 1102 or loaded to a random-access memory (RAM) 1103 from a storage part 1108. Various procedures and data required by the operation of the system 1100 are stored in the RAM 1103. The processing unit 1101, the ROM 1102 and the RAM 1103 are connected with each other via the bus 1104. The I/O interface 1105 is also connected to the bus 1104.

The following parts are connected to the I/O interface 1105, including an input part 1106 of a keyboard, a mouse and the like; an output part 1107 of a cathode-ray tube (CRT), a liquid crystal display (LCD) and a loudspeaker and the like; a storage part 1108 of a hard disk and the like; and a communication part 1109 of a network interface card, including a LAN card and a modem. The communication part 1109 is used for performing communication processing such as Internet. A driver 1110 is also connected to an I/O interface 1105 according to the needs. A detachable medium 1111, including a disk, a CD, a magneto-optical disk and a semiconductor memory, is arranged on the driver 1110 according to the needs, so that a computer program read therefrom is arranged in the memory part 1108 according to the needs. The processing unit 1101 may be CPU, GPU, TPU, FPGA, NPU and the like.

To be specific, the method described in the above may be implemented as a computer software program according to the examples of the present disclosure. For example, the examples of the present disclosure comprise a computer program product, which comprises a computer program physically included on a readable medium thereof, and the computer program comprises a program code used for implementing the above-mentioned method. In such examples, the computer program may be downloaded and installed from the network via the communication part 1109, and/or installed from a removable medium 1111.

The flowcharts and block diagrams in the drawings illustrate the system architecture, functionality, and operation possibly implemented by systems, methods and computer program products according to various examples of the present invention. In this regard, each block in the flowcharts or block diagrams may represent a unit, program segment, or portion of code, which comprises one or more executable instructions for implementing the specified logical function(s). It should also be also noted that, in some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be also noted that each block and combination of blocks in the flowcharts or block diagrams can be implemented by special purpose hardware-based systems which perform the specified functions or steps, or combinations of special purpose hardware and computer instructions.

The units or units involved in the examples of the present disclosure may be implemented by means of software or programmable hardware. The depicted units or units may be also arranged in the processor, and the titles of these units or units do not constitute the definition thereof in some cases.

Based on the same inventive concept, corresponding to the methods according to any one of the foregoing examples, the present disclosure further provides a non-transient computer readable storage medium which stores a computer instruction used for enabling the computer to perform the network capability exposure method according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

The computer instruction stored by the storage medium according to the foregoing examples is used for enabling the computer to perform the network capability exposure method according to any one of the examples, and has the beneficial effects of the corresponding method examples, which are not repeated in detail.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in details for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (eg. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A network capability exposure method applied to a network capability exposure device, comprising:
   receiving a service request sent by a third-party device;
   determining a type of a network capability required according to the service request;
   determining a computing task matching the type of the network capability required;
   determining computing resources exposed by at least one physical device;
   obtaining a computing resource exposure result based on the computing task and the computing resources exposed by the at least one physical device;
   acquiring a network capability corresponding to the type of the network capability and the computing resource exposure result; and
   providing the network capability to the third-party device;
   in response to determining the service request is a network information acquisition request, using a scale-free network model to adjust deployment positions of network function entities in a network model with an objective of minimizing average network information data acquisition time of an adaptive capability exposure interface;
   determining network information matching the network information acquisition request based on the network model; and
   providing the network information to the third-party device via the adaptive capability exposure interface.

2. The network capability exposure method according to claim 1, further comprising:
   acquiring network state information;
   pre-training a network management capability exposure model based on the network state information;
   in response to determining the service request is a network management capability exposure request, determining a network management capability matching the network management capability exposure request based on the network management capability exposure model; and
   providing the network management capability to the third-party device.

3. The network capability exposure method according to claim 2, wherein the network management capability exposure request comprises a network slice management request; the method further comprises:
   managing network slices based on a double deep Q-learning (DDQL) network model; and
   optimizing the DDQL network model based on an experience replay method.

4. The network capability exposure method according to claim 3, wherein the network slice management request comprises a resource block allocation request; wherein, the resource block allocation request corresponds to at least one user equipment (UE);
   the method further comprises:
   initializing each of the at least one physical device as an intelligent agent;
   obtaining the at least one UE corresponding to the physical resource block allocation request;
   determining an immediate reward of the DDQL network model based on a target rate of each of the at least one UE and the number of resource blocks to be allocated;
   determining a target Q value of the DDQL network model based on the immediate reward; and
   obtaining a resource block allocation result as the DDQL network model converges.

5. The network capability exposure method according to claim 1, wherein obtaining a computing resource exposure result based on the computing task and the computing resources exposed by the at least one physical device comprises:
    acquiring idle computing capabilities of the at least one physical device;
    allocating the computing task to the at least one physical device based on a distributed federated learning method and the idle computing capabilities; and
    generating a computing resource exposure result according to allocations of the computing task.

6. The network capability exposure method according to claim 5, wherein allocating the computing task to the at least one physical device based on a distributed federated learning method and the idle computing capabilities comprises:
    allocating the computing tasks with an optimization objective of minimizing energy and time consumed by the computing task.

7. A non-transitory computer-readable storage medium, wherein the non-transitory computer-readable storage medium stores computer instructions, and the computer instructions being used to make the computer execute the network capability exposure method according to claim 1.

8. A network capability exposure device, comprising:
    one or more processors, one or more memories, and a communication bus configured to couple the one or more processors and the one or more memories; wherein
    the one or more memories store one or more instructions, and when executed by the one or more processors, the instructions cause the one or more processors to:
    receive a service request sent by a third-party device;
    determine a type of a network capability required according to the service request;
    determine a computing task matching the type of the network capability required;
    determine computing resources exposed by at least one physical device;
    obtain a computing resource exposure result based on the computing task and the computing resources exposed by the at least one physical device;
    acquire a network capability corresponding to the type of the network capability and the computing resource exposure result; and
    provide the network capability to the third-party device;
    in response to determining the service request is a network information acquisition request, use a scale-free network model to adjust deployment positions of network function entities in a network model with an objective of minimizing average network information data acquisition time of an adaptive capability exposure interface;
    determine network information matching the network information acquisition request based on the network model; and
    provide the network information to the third-party device via the adaptive capability exposure interface.

9. A network capability exposure system, comprising:
    at least one third-party device; at least one physical device and a network capability exposure device according to claim 8.

10. The network capability exposure system according to claim 9, wherein, the at least one third-party device comprises: a server of a third-party application or a user equipment (UE) on which a third-party application is running.

11. The network capability exposure system according to claim 9, wherein, the at least one physical device comprises: a base station or a server.

* * * * *